(12) United States Patent
Nakamura

(10) Patent No.: US 6,461,764 B1
(45) Date of Patent: Oct. 8, 2002

(54) PROTECTIVE CASE FOR ELECTRIC PARTS, AND STORAGE BATTERY PACK

(75) Inventor: Satoshi Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/555,665

(22) PCT Filed: Dec. 21, 1998

(86) PCT No.: PCT/JP98/05830

§ 371 (c)(1),
(2), (4) Date: Jun. 1, 2000

(87) PCT Pub. No.: WO99/34458

PCT Pub. Date: Jul. 8, 1999

(30) Foreign Application Priority Data

Dec. 25, 1997 (JP) ............................................. 9-356440

(51) Int. Cl.⁷ ................................................ H01M 2/02
(52) U.S. Cl. ........................ 429/170; 429/178; 429/179; 429/169; 429/163; 429/96; 429/97; 429/98; 429/99; 429/100
(58) Field of Search ........................... 429/96–100, 163, 429/169, 170, 178, 179

(56) References Cited

U.S. PATENT DOCUMENTS 5,704,803 A * 1/1998 Oshima et al. ............. 439/500

FOREIGN PATENT DOCUMENTS

| JP | 5-68069 | 2/1992 |
| JP | 8-185837 | 12/1994 |
| JP | 8-241700 | 3/1995 |
| JP | 8-241701 | 3/1995 |

* cited by examiner

Primary Examiner—Patrick Ryan
Assistant Examiner—Angela J. Martin
(74) Attorney, Agent, or Firm—Merchant & Gould P.C.

(57) ABSTRACT

A protective case for housing electric parts such as a storage battery (2) and a protective circuit (3). For example, the case comprises a body (1A) and a lid (1B). The body (IA) is formed integrally with a first terminal piece (4), which connects a terminal (30) of the protective circuit (3) with an external terminal (41) of the protective case. The lid (1B) is formed integrally with a second terminal piece (21), which connects the terminal (30) of the protective case (3) with an external terminal (42) of the protective case.

16 Claims, 6 Drawing Sheets

PROTECTIVE CASE FOR ELECTRIC PARTS, AND STORAGE BATTERY PACK

TECHNICAL FIELD

The present invention relates to a protective casing for housing an electric component and for providing electric conduction between the electric component and an external object. It also relates to a rechargeable battery pack using such a protective casing.

BACKGROUND ART

A prior-art rechargeable battery pack used for electric equipment such as a mobile phone has such a structure as shown in FIGS. 5 and 6. The rechargeable battery pack 101 includes a casing body 101A and a lid 101B. The casing body 101A is upwardly open and has a side wall 110 formed with a through-hole 101a. The lid 101B, which is capable of closing the upward opening 112 of the casing body 101A, is formed with a plurality of through-holes 111a. The casing body 101A accommodates rechargeable batteries 102 and a protective circuit board 103.

The protective circuit board 103 functions to prevent the rechargeable batteries 102 from being overcharged. The protective circuit board 103 is electrically connected to the rechargeable batteries 102. The protective circuit board 103 is formed with a plurality of terminals 130 protruding from the surface thereof. When the protective circuit board 103 is housed in the casing body 101A, the terminals 130 protrude outwardly from the casing body 101A via a through-hole 101a.

The rechargeable battery pack 101 is provided with a plurality of terminal segments 121 extending onto the upper surface of the rechargeable batteries 102. Each of the terminal segments 121 has an end 121a electrically connected to a terminal 120 of a corresponding rechargeable battery 102 and the other end 121b protruding outward from the lid 101B through a corresponding through-hole 111a.

Thus, it is possible for the rechargeable batteries 102 to be charged from the outside through the terminals 130 and to discharge (to supply power) to the outside through the terminal segments 121.

The through-hole 110a is designed to have a size sufficient for easily receiving a corresponding terminal 130. Each of the through-holes 111a is designed to have a size sufficient for easily receiving the other end 121b of a corresponding terminal segment 121. Accordingly, a clearance is formed around each of the terminals 130 and each of the other ends 121b of the terminal segments 121, which allows communication between the inside and the outside of the casing body 101A. As a result, moisture and/or dust for example may enter from the outside via the through-holes 101a, 111a, which may cause a problem such as shorting in the protective circuit board 103.

To solve this problem, it may be considered that the surface of the protective circuit board 103 may be coated with a resin for example for protecting the protective circuit board 103. However, to perform such an additional step decreases the production efficiency, increases the cost, and further, bars the weight reduction of the rechargeable battery pack 101.

DISCLOSURE OF THE INVENTION

It is, therefore, an object of the present invention to positively protect electric components such as rechargeable batteries and a protective circuit board without increasing the cost.

In accordance with a first aspect of the present invention, there is provided a protective casing for housing an electric component and for providing electric conduction between the electric component and an external object, wherein the protective casing is integrally formed with terminal segments each of which has one end for electrical connection to the electric component, each said terminal segment having another end for electrical connection to the object.

The terminal segments integrated with the protective casing are utilized as a means for providing conduction between the electric component housed in the protective casing and the external object. Unlike the prior art arrangement in which each terminal of an electric component is externally exposed via a through-hole, the terminal segments provide an integral structure together with the protective casing for electrical connection to both the inside and the outside of the protective casing, thereby enhancing the hermetic ability of the protective casing against entry of moisture or the like from the outside. As a result, it is possible to reliably protect the electric component housed in the protective casing from moisture, dust or the like.

The electric component to be housed in the protective casing may be a circuit board which carries semiconductor chips for example, or a rechargeable battery.

According to a preferred embodiment, the protective casing comprises a box-like casing body which is formed by resin-molding to have an opening, and a resin lid for closing the opening, wherein at least one of the casing body and the lid being insert-molded with the terminal segments.

According to another preferred embodiment, said one end of each said terminal segment is exposed or extended internally of the casing body, whereas said another end of said each terminal segment is exposed or extended externally of the casing body or the lid.

According to a further preferred embodiment, the terminal segments include a first terminal segment insert-molded with the casing body, and a second terminal segment insert-molded with the lid, wherein the first terminal segment comes into contact with the second terminal segment when the lid is mounted on the casing body to close the opening.

According to still another preferred embodiment, the second terminal segment is pressed against a terminal of the electric component due to elastic restoration of the first terminal segment.

According an alternative preferred embodiment, the first terminal segment is pressed against a terminal of the electric component due to elastic restoration of the second terminal segment.

According to a still further preferred embodiment, the first terminal segment has a portion extending internally of the casing body, wherein said portion is convexly bent to have an apex for clamping the second terminal segment between the apex and the terminal of the electric component.

According to an alternative preferred embodiment, the second terminal segment has a portion extending internally of the casing body, wherein said portion is convexly bent to have an apex for clamping the first terminal segment between the apex and the terminal of the electric component.

In accordance with a second aspect of the present invention, there is provided a rechargeable battery pack comprising rechargeable batteries, a protective circuit board electrically connected to the rechargeable batteries for protecting the rechargeable batteries, and a resin casing for housing the batteries and the protection circuit board, wherein the casing is insert-molded integrally with terminal segments which are electrically connected to the protective circuit board and/or the rechargeable batteries and are electrically connectable to an external object.

In this rechargeable battery pack, the terminal segments are integrated with the casing by insert molding, and the rechargeable batteries and the protective circuit board housed in the casing are electrically connected to the external object, so that the casing is not formed with a passageway for communication between the inside and the outside of the casing, as opposed to the prior art. Therefore, moisture and dust are unlikely to enter the casing, and hence, it is unnecessary to coat the protective circuit board with a resin for example to prevent shorting in the protective circuit board. Further, since the terminal segments can be mounted at the same time as resin-molding the casing, it is possible to provide electric conduction between the inside and the outside of the casing and to reliably protect the protective circuit board against moisture and dust without causing a decrease of the assembly efficiency and an increase of the manufacturing cost.

According to a preferred embodiment, the protective casing comprises a box-like casing body which is formed by resin-molding to have an opening, and a resin lid for closing the opening, wherein at least one of the casing body and the lid being insert-molded with the terminal segments.

According to another preferred embodiment, said one end of each said terminal segment is exposed or extended internally of the casing body, whereas said another end of said each terminal segment is exposed or extended externally of the casing body or the lid.

According to a further preferred embodiment, the terminal segments include a first terminal segment insert-molded with the casing body, and a second terminal segment insert-molded with the lid, wherein the first terminal segment comes into contact with the second terminal segment when the lid is mounted on the casing body to close the opening.

According to still another preferred embodiment, the second terminal segment is pressed against a terminal of the electric component due to elastic restoration of the first terminal segment.

According an alternative preferred embodiment, the first terminal segment is pressed against a terminal of the electric component due to elastic restoration of the second terminal segment.

According to a still further preferred embodiment, the first terminal segment has a portion extending internally of the casing body, wherein said portion is convexly bent to have an apex for clamping the second terminal segment between the apex and the terminal of the electric component.

According to an alternative preferred embodiment, the second terminal segment has a portion extending internally of the casing body, wherein said portion is convexly bent to have an apex for clamping the first terminal segment between the apex and the terminal of the electric component.

Various features and advantages of the present invention will be apparent from the detailed description of a preferred embodiment given below with reference to the accompanying drawings.

BEST MODE FOR CARRYING OUT THE INVENTION

Figure 1:
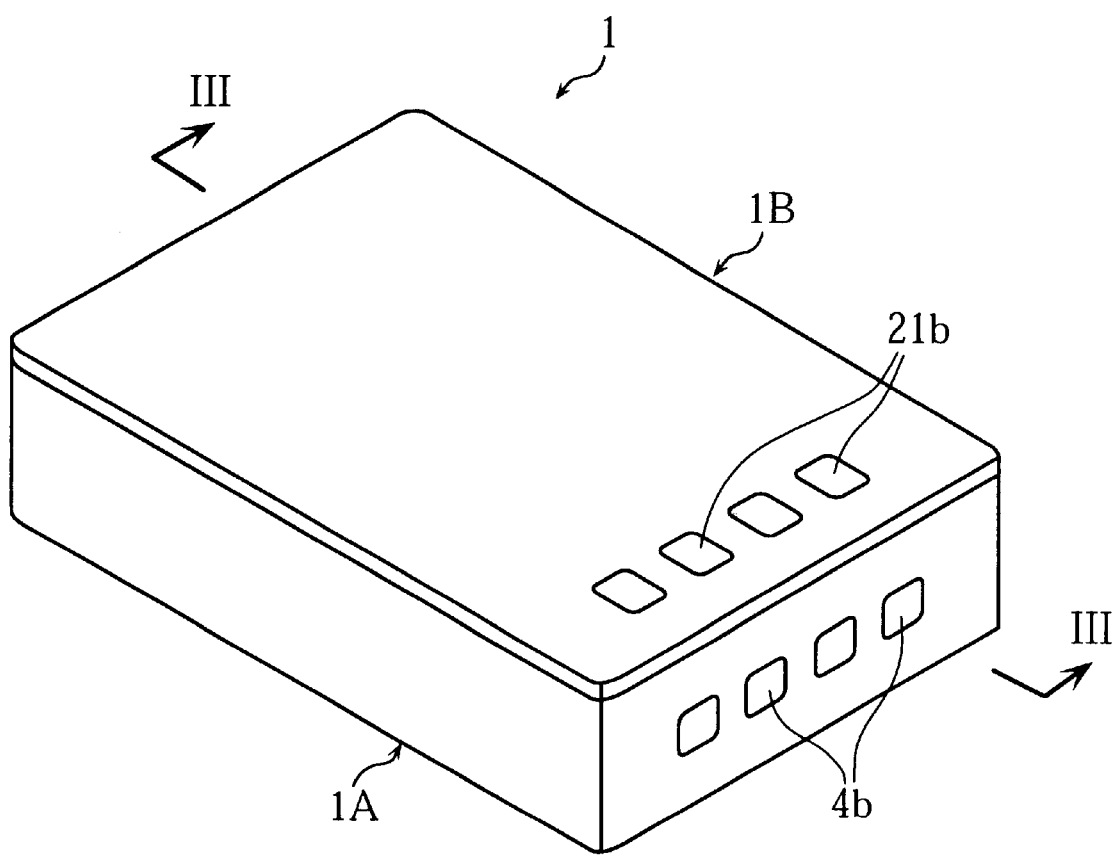
FIG. 1 is an overall perspective view showing a rechargeable battery pack embodying the present invention.
Figure 2:
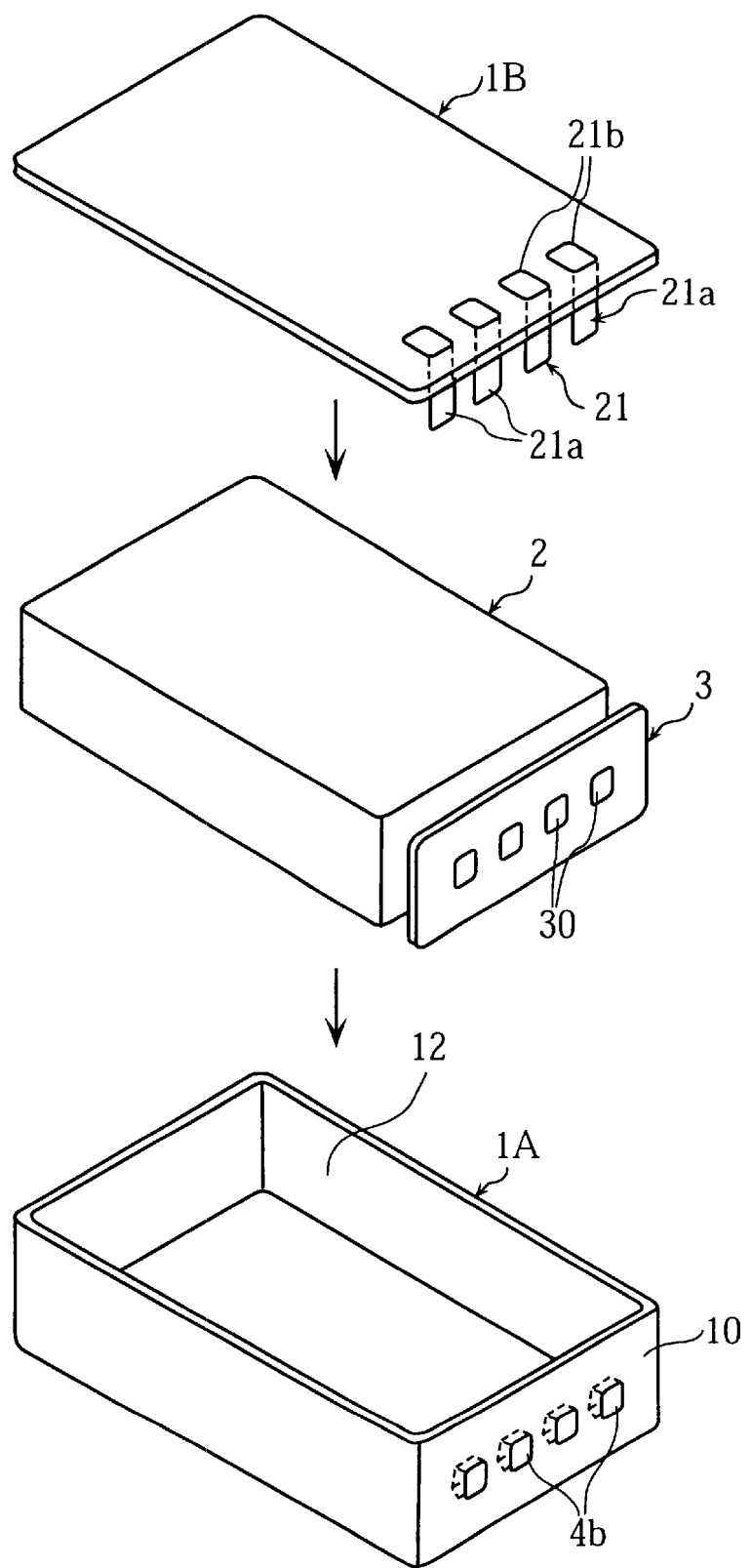
FIG. 2 is an exploded perspective view of the rechargeable battery pack shown in FIG. 1.
Figure 3:
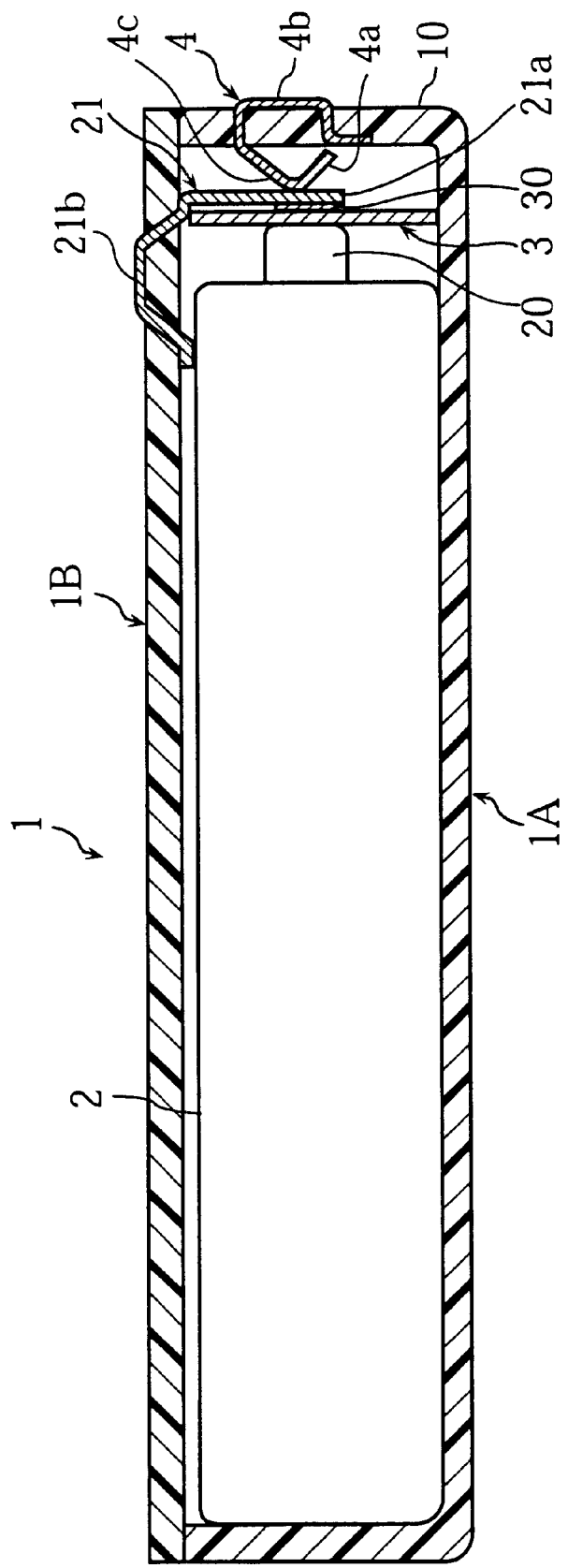
FIG. 3 is a sectional view taken along lines III—III in FIG. 1.

The preferred embodiment of the present invention will be described below with reference to FIGS. 1 through 4.

A rechargeable battery pack 1 generally comprises a casing body 1A made of a resin, a lid 1B similarly made of a resin, rechargeable batteries 2 housed in the casing body 1A, and a protective circuit board 3 for preventing the rechargeable batteries 2 from being overcharged.

The casing body 1A, which may be formed by molding for example, has a configuration of a bottomed box which is upwardly open. The casing body 1A has a side wall 10 provided with a plurality of first terminal segments 4 each partially embedded by insert molding. Each of the first terminal segments 4 has an end portion 4a which is convexly bent to project inwardly of the casing body 1A. The bent of each first terminal segment 4 has an apex 4c which is movable toward the side wall 10 of the casing body 1A. The other end 4b of the first terminal segment 4 is exposed externally at the side wall 10 of the casing body 1A.

The lid 1B is formed, by molding, into a plate-like configuration to close the upper opening 12 of the casing body 1A. The lid 1B is provided with a plurality of second terminal segments 21 each partially embedded by insert molding. Each of the second terminal segments 21 has an end 21a suspending from the lid 1B into the casing body 1A, whereas the other end 21b of each second terminal segment is exposed externally of the lid 1B.

Various electronic parts such as semiconductor chips and/or resistors may be mounted on the protective circuit board 3. The protective circuit board 3 has an obverse surface provided with a plurality of terminals 30 each of which is electrically connected with a respective electronic part and a respective rechargeable battery 2. Each of the terminals 30 may comprise a gold-plated electrode pad made of aluminum or copper for example. The terminal 30 is electrically connected to a corresponding first terminal segment 4 and a corresponding second terminal segment 21. The rechargeable batteries 2 are housed on the reverse side of the protective circuit board 3 in side-by-side relation to each other. Each of the batteries 2 has a terminal 20 electrically connected to a corresponding terminal 30 via a wiring pattern formed on the protective circuit board 3.

The rechargeable battery pack 1 having the above structure may be obtained by placing the rechargeable batteries 2 and the protective circuit board 3 in the casing body 1A, and then closing the upper opening 12 of the casing body 1A with the lid 1B.

Figure 4:
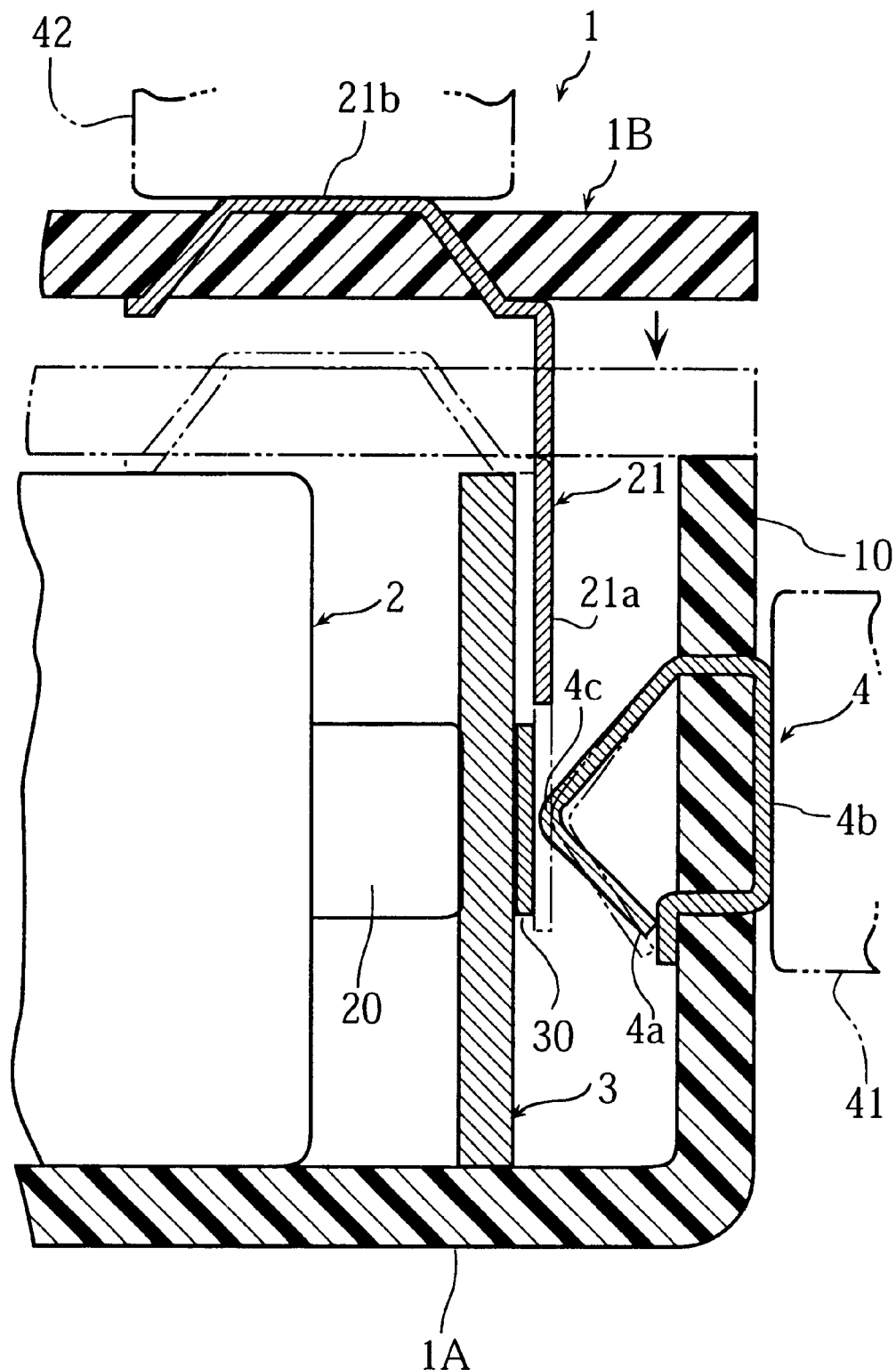
FIG. 4 is an enlarged sectional view illustrating a principal portion of the rechargeable battery pack shown in FIG. 1.
Figure 5:
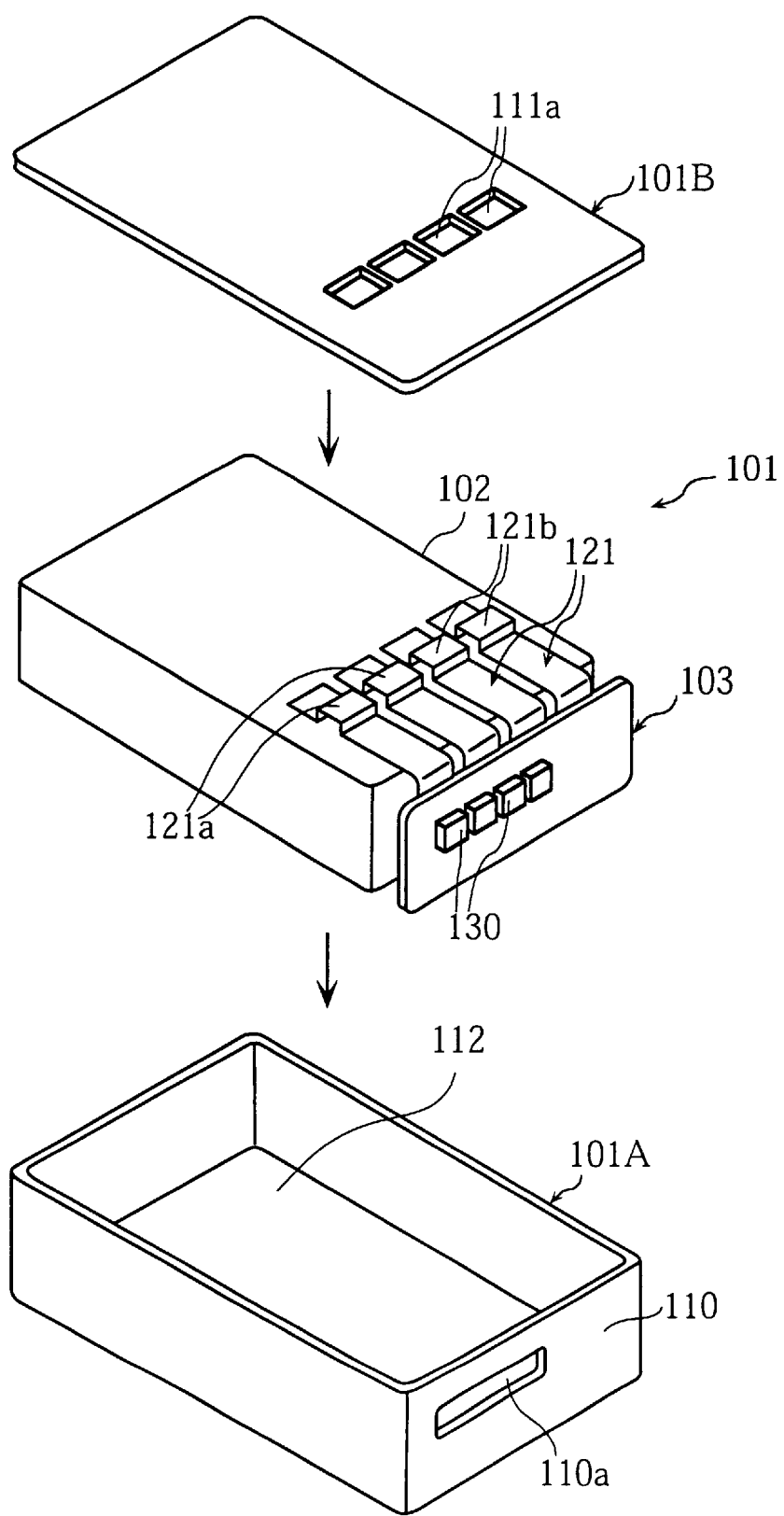
FIG. 5 is an exploded perspective view showing a prior-art rechargeable battery pack.
Figure 6:
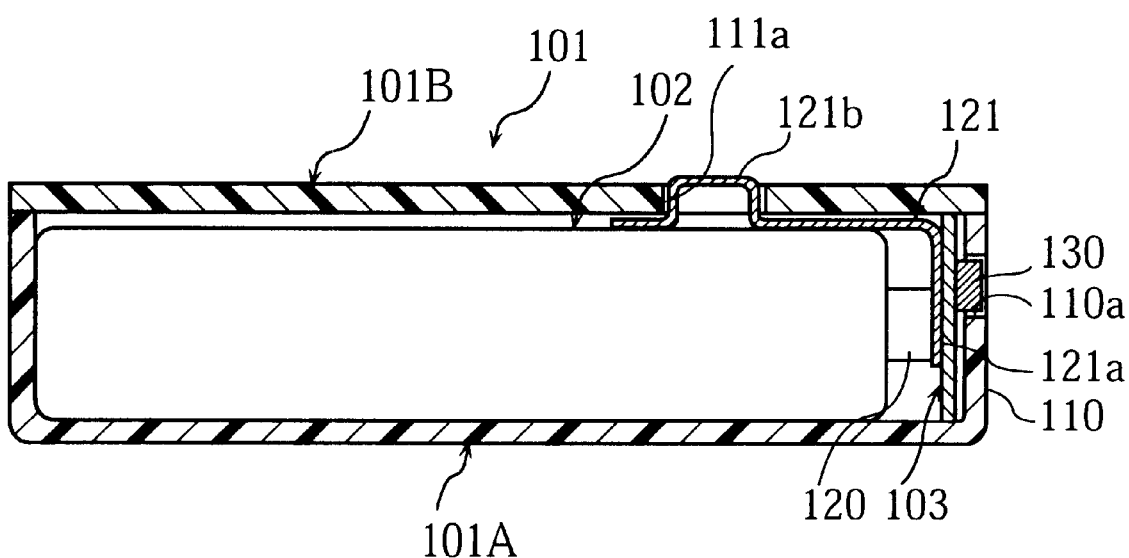
FIG. 6 is a sectional view showing the prior-art rechargeable battery pack.

Specifically, as clearly shown in FIG. 4, the protective circuit board 3 is housed in the casing body 1A so that each of the terminals 30 of the protective circuit board 3 comes into contact with a corresponding first terminal segment 4. Then, the rechargeable batteries 2 are housed in side-by-side relation to each other to be electrically connected to the protective circuit board 3. At this time, since the apex 4c of each first terminal segment 4 is movable toward the side wall 10 of the casing body 1A, it is possible to position the rechargeable batteries 2 next to the protective circuit board 3 within the casing body 1A.

Then, the upper opening 12 of the casing body 1A is closed with the lid 1B. At this time, the end 21a of each second terminal segment 21 suspending from the lid 1B is inserted, from above, between a corresponding terminal 30 of the protective circuit board 3 and a corresponding end 4a of the first terminal segment 4 which are otherwise in contact with each other. Since the apex 4c of the first terminal segment 4 is movable toward the side wall 10 of the casing body 1A, it is possible to easily insert the end 21a of the second terminal segment 21. The end 21a of the second terminal segment 21 is clamped due to the elastic restoration of the end 4a of the first terminal segment 4.

After the upper opening 12 of the casing body 1A is closed with the lid 1B with the end 21a of each second terminal segment 21 inserted, the casing body 1A and the lid 1B are bonded together by a resin adhesive or by ultrasonic welding for example.

In this way, a rechargeable battery pack 1 is obtained in which the ends 4b of the first terminal segments 4 and the ends 21b of the second terminal segments 21 are exposed to the outside (See FIG. 1). The rechargeable batteries 2 of the battery pack 1 may be charged from terminals 41 of an external charger, for example, through the ends 4b of the first terminal segments 4. Further, it is possible to supply power from the rechargeable batteries 2 to power supply terminals 42 of a mobile phone for example, which is electrically connected to the ends 21b of the second terminal segments 21.

Since each of the first terminal segments 4 is partially embedded in the casing body 1A while each of the second terminal segments 21 is partially embedded in the lid 1B, it is possible to electrically connect the inside of the casing body to the external parts without forming a communication opening which was conventionally necessary. Further, due to the insert-molding of the first terminal segments 4 and the second terminal segments 21 together with the casing body 1A and the lid 1B, respectively, it is possible to prevent external moisture and/or dust from entering into the rechargeable pack 1 without adding any means for protecting the rechargeable batteries 2 and the protective circuit board 3 of the rechargeable battery pack 1.

Further, due to the prevention of moisture and/or dust entry into the casing body 1A, the protective circuit board 3 does not need to be coated with a resin for example for prevention of shorting. In addition, the first terminal segments 4 and the second terminal segments 21 may be integrated with the casing body 1A and the lid 1B, respectively, by insert molding, so that protection of the protective circuit board 3 does not result in a decrease of the production efficiency and an increase of the cost.

On the other hand, since the end 21a of each second terminal segment 21 is kept pressed against a corresponding terminal 30 of the protective circuit board 3 at the apex 4c of a corresponding first terminal segment 4, it is possible to reliably maintain electric conduction between the second terminal segment 21, the first terminal segment 4, and the terminal 30. As a result, it is possible to positively prevent contact failure due to vibration for example.

In the embodiment described above, the protective casing or the casing comprising the casing body 1A and the lid 1B accommodates the rechargeable batteries 2 and the protective circuit board 3. However, other electric components may be housed instead of the rechargeable batteries 2 and the protective circuit board 3.

Further, although both the first terminal segments 4 and the second terminal segments 21 are provided in the above embodiment, only one kind of the segments may be provided.

In the above embodiment, since the end 4a of each first terminal segment 4 faces a corresponding terminal 30 of the protective circuit board 3, that end 4a of the first terminal segment 4 is convexly bent while the end 21a of each second terminal segment 21 is made flat. However, in case where the end 21a of each second terminal segment 21 faces a corresponding terminal 30 of the protective circuit board 3, that end 21a of the second terminal 21 may be convexly bent while the end 4a of the first terminal segment 4 may be made flat.

What is claimed is:

1. A protective casing for housing an electric component and for providing electric conduction between the electric component and an external object, the casing comprising:

a box-shaped casing body which is formed by resin-molding to have an opening, and a resin lid for closing the opening;

wherein the casing body is insert-molded with a first terminal segment which has one end for electrical connection to the electric component, the first terminal segment having another end for electrical connection to the object;

wherein the lid is insert-molded with a second terminal segment which has one end for electrical connection to the electric component, the second terminal segment having another end for electrical connection to the object;

wherein said one end of the first terminal segment is extended internally of the protective casing, said another end of the first terminal segment being exposed externally of the casing body;

wherein said one end of the second terminal segment is extended internally of the protective casing, said another end of the second terminal segment being exposed externally of the lid; and wherein the first terminal segment comes into contact with the second terminal segment when the lid is mounted on the casing body to close the opening.

2. The protective casing according to claim 1, which comprises a box-shaped casing body which is formed by resin-molding to have an opening, and a resin lid for closing the opening, at least one of the casing body and the lid being insert-molded with the terminal segments.

3. The protective casing according to claim 2, wherein said one end of each said terminal segment is exposed or extended internally of the casing body, said another end of said each terminal segment being exposed or extended externally of the casing body or the lid.

4. The protective casing according to claim 3, wherein the terminal segments include a first terminal segment insert-molded with the casing body, and a second terminal segment insert-molded with the lid, the first terminal segment coming into contact with the second terminal segment when the lid is mounted on the casing body to close the opening.

5. The protective casing according to claim 1, wherein the second terminal segment is pressed against a terminal of the electric component due to elastic restoration of the first terminal segment.

6. The protective casing according to claim 1, wherein the first terminal segment is pressed against a terminal of the electric component due to elastic restoration of the second terminal segment.

7. The protective casing according to claim 5, wherein the first terminal segment has a portion extending internally of the casing body, said portion being convexly bent to have an apex for clamping the second terminal segment between the apex and the terminal of the electric component.

8. The protective casing according to claim 6, wherein the second terminal segment has a portion extending internally of the casing body, said portion being convexly bent to have an apex for clamping the first terminal segment between the apex and the terminal of the electric component.

9. A rechargeable battery pack comprising rechargeable batteries, a protective circuit board electrically connected to the rechargeable batteries for protecting the rechargeable batteries, and a resin casing for housing the batteries and the protective circuit board, wherein the casing comprises a box-shaped casing body having an opening, and a lid for closing the opening;

wherein the casing body is insert-molded with a first terminal segment which has one end for electrical connection to the protective circuit board and/or a respective battery, the first terminal segment having another end for electrical connection to the object;

wherein the lid is insert-molded with a second terminal segment which has one end for electrical connection to the protection circuit board and/or a respective battery, the second terminal segment having another end for electrical connection to the object;

wherein said one end of the first terminal segment is extended internally of the casing, said another end of the first terminal segment being exposed externally of the casing body;

wherein said one end of the second terminal segment is extended internally of the casing, said another end of the second terminal segment being exposed externally of the lid; and wherein the first terminal segment comes into contact with the second terminal segment when the lid is mounted on the casing body to close the opening.

10. The rechargeable battery pack according to claim 9, wherein the casing comprises a box-shaped casing body having an opening, and a lid for closing the opening.

11. The rechargeable battery pack according to claim 10, wherein each of the terminal segments has one end exposed or extended internally of the casing body, each said terminal segment having another end exposed or extended externally of the casing body or the lid.

12. The rechargeable battery pack according to claim 11, wherein the terminal segments include a first terminal segment insert-molded with the casing body, and a second terminal segment insert-molded with the lid, the first terminal segment coming into contact with the second terminal segment when the lid is mounted on the casing body to close the opening.

13. The rechargeable battery pack according to claim 9, wherein the second terminal segment is pressed against a terminal of the electric component due to elastic restoration of the first terminal segment.

14. The rechargeable battery pack according to claim 9, wherein the first terminal segment is pressed against a terminal of the electric component due to elastic restoration of the second terminal segment.

15. The rechargeable battery pack according to claim 13, wherein the first terminal segment has a portion extending internally of the casing body, said portion being convexly bent to have an apex for clamping the second terminal segment between the apex and the terminal of the electric component.

16. The rechargeable battery pack according to claim 14, wherein the second terminal segment has a portion extending internally of the casing body, said portion being convexly bent to have an apex for clamping the first terminal segment between the apex and the terminal of the electric component.

* * * * *